United States Patent
Nagahama et al.

(10) Patent No.: US 8,841,357 B2
(45) Date of Patent: Sep. 23, 2014

(54) BINDER FOR INK-JET PRINTING INK, INK-JET PRINTING INK CONTAINING THE SAME, AND PRINTED MATTER

(75) Inventors: Sadamu Nagahama, Osaka (JP); Mitsuru Kitada, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/009,235

(22) PCT Filed: Jan. 31, 2012

(86) PCT No.: PCT/JP2012/052090
§ 371 (c)(1),
(2), (4) Date: Oct. 1, 2013

(87) PCT Pub. No.: WO2012/137529
PCT Pub. Date: Oct. 11, 2012

(65) Prior Publication Data
US 2014/0037913 A1    Feb. 6, 2014

(30) Foreign Application Priority Data
Apr. 6, 2011   (JP) ................................. 2011-084487

(51) Int. Cl.
| C09D 11/30 | (2014.01) |
| C09D 11/00 | (2014.01) |
| C08G 18/75 | (2006.01) |
| C08G 18/08 | (2006.01) |
| C08G 18/12 | (2006.01) |
| C09D 11/322 | (2014.01) |
| B41J 2/01 | (2006.01) |
| C08G 18/48 | (2006.01) |
| C09D 175/04 | (2006.01) |

(52) U.S. Cl.
CPC ............. *C09D 11/30* (2013.01); *C09D 11/00* (2013.01); *C08G 18/755* (2013.01); *C08G 18/0823* (2013.01); *C08G 18/12* (2013.01); *C09D 11/322* (2013.01); *B41J 2/01* (2013.01); *C08G 18/4854* (2013.01); *C09D 175/04* (2013.01)
USPC .......... 523/160; 523/161; 428/195.1; 524/591

(58) Field of Classification Search
CPC .. C09D 11/00; C08G 18/755; C08G 18/0823; C08G 18/12

USPC .................................................. 523/160, 161
See application file for complete search history.

(56) References Cited

U.S. PATENT DOCUMENTS

| 2005/0182154 A1* | 8/2005 | Berge et al. ................... 523/160 |
| 2009/0092801 A1 | 4/2009 | Sato et al. |
| 2012/0164400 A1* | 6/2012 | Nagahama ................. 428/195.1 |

FOREIGN PATENT DOCUMENTS

| JP | 2000-001639 A | 1/2000 |
| JP | 2008-280363 A | 11/2008 |
| WO | 2007/125917 A1 | 11/2007 |
| WO | 2011/004675 A1 | 1/2011 |
| WO | WO 2011/004675 | * 1/2011 |

OTHER PUBLICATIONS

An International Search Report, mailed Apr. 17, 2012, which issued during the prosecution of International Application No. PCT/JP2012/052090, which corresponds to the present application.
An Office Action, mailed Jul. 19, 2012, which issued during the prosecution of Japanese Application No. 2012-524428, which corresponds to the present application.

* cited by examiner

*Primary Examiner* — Doris Lee
(74) *Attorney, Agent, or Firm* — McDermott Will & Emery LLP

(57) ABSTRACT

It is an object of the present invention to provide a binder for ink-jet printing ink that can form printed images having excellent scratch resistance and good alcohol resistance without impairing good discharge stability of ink. The present invention relates to a binder for ink-jet printing ink including a polyurethane (A) that has a hydroxyl group at a molecular terminal, has a weight-average molecular weight of 30,000 to 70,000, and is obtained by causing a reaction of a polyisocyanate and a polyol (a2) containing a particular polyether polyol so that the equivalent ratio [isocyanate group [X]/hydroxyl group [Y]] of an isocyanate group [X] in the polyisocyanate (a1) to a hydroxyl group [Y] in the polyol (a2) is in the range of 0.930 to 0.995 and an aqueous medium (B). The hydroxyl group present at the molecular terminal of the polyurethane (A) is a hydroxyl group derived from the polyether polyol.

7 Claims, No Drawings

BINDER FOR INK-JET PRINTING INK, INK-JET PRINTING INK CONTAINING THE SAME, AND PRINTED MATTER

CROSS REFERENCE TO PRIOR APPLICATIONS

This application is a U.S. National Phase application under 35 U.S.C. §371 of International Application No. PCT/JP2012/052090, filed on Jan. 31, 2012 and claims benefit of priority to Japanese Patent Application No. 2011-084487, filed on Apr. 6, 2011. The International Application was published in Japanese on Oct. 11, 2012 as WO 2012/137529 A1 under PCT Article 21(2). The contents of the above applications are hereby incorporated by reference.

TECHNICAL FIELD

The present invention relates to a binder for ink that can be used for ink-jet printing and an ink-jet printing ink containing the binder.

BACKGROUND ART

Recently, in the ink-jet printing industry, which has been significantly growing, the realization of high-performance ink-jet printers, the improvement of inks, and the like have markedly progressed, and it has become possible to easily obtain very fine images with high gloss which are substantially equivalent to film photos even in ordinary households.

In particular, the improvement of inks, such as a shift from known dye inks to pigment inks or a shift from solvent-based inks to aqueous inks, has been rapidly advanced in order to increase the image quality and reduce the load on the environment. At present, inks based on aqueous pigment inks are being actively developed.

Such inks have been required to have a higher level of performance year by year with the realization of high-performance ink-jet printers and the like. For example, scratch resistance at such a level that discoloration, degradation, and the like of printed images due to detachment of pigments caused by friction or the like when external forces are exerted to the surface of the printed images can be prevented and alcohol resistance at such a level that bleeding and discoloration of printed images are not caused when an alcohol contained in a detergent and the like is attached to the surface of the printed images have been strongly demanded in recent years without impairing good discharge stability and good storage stability of ink.

For example, the following ink-jet recording ink containing a pigment, an aqueous resin, and an aqueous medium is known as the above ink having excellent scratch resistance. In the ink-jet recording ink, the aqueous resin is a polyurethane resin obtained by a reaction of an organic diisocyanate with a diol having a polyoxyethylene structure, and the polyurethane resin has a carboxyl group and also has a particular acid value, a particular number-average molecular weight, and a particular amount of the polyoxyethylene structure (e.g., refer to PTL 1).

Images printed with the ink-jet recording ink have scratch resistance to a certain degree that, for example, the detachment of pigments due to rubbing between paper sheets can be prevented.

However, a higher level of scratch resistance is required with the expansion of the fields to which ink-jet printed matter is applied. In such circumstances, printed images formed using the ink-jet recording ink are sometimes still discolored, degraded, or damaged because of the detachment or the like of pigments, for example, when strong external forces are locally exerted. There is also a case where, when an alcohol adheres to the surface of the printed images formed using the ink-jet recording ink, floating, bleeding, and the like are caused on the printed surface.

As described above, an ink-jet printing ink that can form printed images having excellent scratch resistance and good alcohol resistance without impairing good discharge stability and good storage stability of ink has been demanded from the industrial world. However, such an ink-jet printing ink and a binder for ink-jet printing ink that can be used for the production of the ink-jet printing ink have not been found yet.

CITATION LIST

Patent Literature

PTL 1: Japanese Unexamined Patent Application Publication No. 2000-1639

SUMMARY OF INVENTION

Technical Problem

It is an object of the present invention to provide a binder for ink-jet printing ink that can form printed images having excellent scratch resistance and good alcohol resistance without impairing good discharge stability of ink and an ink-jet printing ink containing the binder.

Solution to Problem

The inventors of the present invention have conducted studies to achieve the above object and have found that the object can be achieved by using a relatively-high-molecular-weight polyurethane among polyurethanes obtained by causing a reaction of a polyisocyanate (a1) and a polyol (a2). The relatively-high-molecular-weight polyurethane is obtained by adjusting the equivalent ratio [isocyanate group [X]/hydroxyl group [Y]] of an isocyanate group [X] in the polyisocyanate (a1) to a hydroxyl group [Y] in the polyol (a2) to be in an extremely limited range of 0.930 to 0.995 and also by designing a structure in which the hydroxyl group of the polyurethane is a hydroxyl group derived from a particular polyol.

The present invention relates to a binder for ink-jet printing ink, including a polyurethane (A) that has a hydroxyl group at a molecular terminal, has a weight-average molecular weight of 30,000 to 70,000, and is obtained by causing a reaction of a polyisocyanate (a1) and a polyol (a2) containing a polyether polyol (a2-1) represented by general formula [I] below so that the equivalent ratio [isocyanate group [X]/hydroxyl group [Y]] of an isocyanate group [X] in the polyisocyanate (a1) to a hydroxyl group [Y] in the polyol (a2) is in the range of 0.930 to 0.995 and an aqueous medium (B), wherein the hydroxyl group present at the molecular terminal of the polyurethane (A) is a hydroxyl group derived from the polyether polyol (a2-1), an ink-jet printing ink containing the binder, and printed matter.

[Chem. 1]

General formula [I]

(R in general formula [I] represents an alkylene group having 3 to 8 carbon atoms, and n is an average number of addition moles of a structural unit RO in general formula [I], n being in the range of 8 to 55).

Advantageous Effects of Invention

According to the ink-jet printing ink containing the binder for ink-jet printing ink of the present invention, the discharge stability of ink is not impaired, very fine printed images can be maintained without causing, for example, the detachment of pigments even if strong external forces are exerted, and scratch resistance substantially equivalent to that of film photos and alcohol resistance can be provided. Therefore, for example, printed matter formed by ink-jet photo printing or ink-jet high-speed printing can be used in various scenes such as outdoor advertisement.

DESCRIPTION OF EMBODIMENTS

A binder for ink-jet printing ink of the present invention includes a polyurethane (A) that has a hydroxyl group at a molecular terminal, has a weight-average molecular weight of 30,000 to 70,000, and is obtained by causing a reaction of a polyisocyanate (a1) and a polyol (a2) containing a polyether polyol (a2-1) represented by general formula [I] below so that the equivalent ratio [isocyanate group [X]/hydroxyl group [Y]] of an isocyanate group [X] in the polyisocyanate (a1) to a hydroxyl group [Y] in the polyol (a2) is in the range of 0.930 to 0.995, an aqueous medium (B), and optionally other additives. The hydroxyl group present at the molecular terminal of the polyurethane (A) is a hydroxyl group derived from the polyether polyol (a2-1). The polyurethane (A) and the additives are soluble or dispersible in the aqueous medium (B).

First, the polyurethane (A) used in the present invention will be described.

The polyurethane (A) used in the present invention is a binder resin for ink-jet printing ink.

The polyurethane (A) preferably has an aliphatic structure or an alicyclic structure to prevent yellowing and is more preferably a polyurethane not having a cross-linking point, that is, a linear polyurethane. The polyurethane (A) may be a polyurethane having a branched structure, but is preferably a polyurethane having an average number of functional groups of hydroxyl groups of 2 or less and more preferably 1 or more and 2 or less. The average number of functional groups represents the average number of hydroxyl groups present in the polyurethane (A).

It is essential to use a polyurethane having a weight-average molecular weight of 30,000 to 70,000, which is a relatively high molecular weight, as the polyurethane (A) for the purpose of forming a printed image having excellent scratch resistance and good alcohol resistance without impairing good discharge stability of ink.

If a polyurethane having a weight-average molecular weight of about 27,000, which is less than 30,000, is used instead of the polyurethane (A), sufficient scratch resistance and alcohol resistance sometimes cannot be produced. If a polyurethane having a weight-average molecular weight of about 75,000, which is more than 70,000, is used, sufficient discharge stability sometimes cannot be maintained.

The polyurethane (A) is preferably a polyurethane having a weight-average molecular weight of 30,000 to 55,000 for the purpose of improving the discharge stability of ink and scratch resistance. In order to form a printed image having, in addition to the scratch resistance and alcohol resistance, excellent alkali resistance at such a level that bleeding and the like are not caused even when an alkali component contained in a strong detergent and the like is attached to the surface of printed images, the polyurethane (A) is preferably a polyurethane having a weight-average molecular weight of 40,000 to 70,000.

It is essential to use, as the polyurethane (A), a polyurethane obtained by causing a reaction of the polyisocyanate (a1) and the polyol (a2) under the extremely limited condition that satisfies the equivalent ratio [isocyanate group [X]/hydroxyl group [Y]] of an isocyanate group [X] in the polyisocyanate (a1) to a hydroxyl group [Y] in the polyol (a2) being in the range of 0.930 to 0.995 for the purpose of forming a printed image having excellent scratch resistance and alcohol resistance without impairing good discharge stability of ink. The isocyanate group [X] represents a functional group included in the polyisocyanate (a1) and the hydroxyl group [Y] represents a functional group included in the polyol (a2).

If a polyurethane obtained by causing the reaction under the condition that satisfies the equivalent ratio being 0.900, which is less than 0.930, is used instead of the polyurethane (A), sufficient scratch resistance and alcohol resistance sometimes cannot be produced. If a polyurethane obtained by causing the reaction under the condition that satisfies the equivalent ratio being 1.000, which is more than 0.995, is used, sufficient discharge stability sometimes cannot be maintained.

Therefore, to, achieve the object of the present invention, a polyurethane obtained by causing the reaction of the polyisocyanate (a1) and the polyol (a2) so that the equivalent ratio is in the range of 0.930 to 0.995 is used as the polyurethane (A).

A polyurethane having a hydroxyl group at both molecular terminals is used as the polyurethane (A). The hydroxyl group is a hydroxyl group derived from a polyether polyol (a2-1) represented by general formula [I] below.

[Chem. 2]

General formula [I]

(R in general formula [I] represents an alkylene group having 3 to 8 carbon atoms, and n is an average number of addition moles of a structural unit RO in general formula [I], n being in the range of 8 to 55.)

By introducing a hydroxyl group derived from the polyether polyol (a2-1) into both molecular terminals of the polyurethane (A), a binder for ink-jet printing ink that can provide better water dispersion stability and discharge stability can be obtained.

R in general formula [I] is specifically, for example, a propylene group, a butylene group, or a tetramethylene group. Furthermore, n in general formula [I] is an average number of addition moles of an RO (oxyalkylene) structure, which is a structural unit in general formula [I], and is preferably 8 to 55 and more preferably 12 to 35.

The polyether polyol (a2-1) may be a mixture of two or more polyether polyols having different values of n and different types of R. In particular, n generally has a distribution like the molecular weight of the obtained polyether polyol (a2-1). Therefore, n represents the average value in the polyether polyol (a2-1) used.

In the present invention, it is not sufficient to use polyurethanes having the particular hydroxyl group at their both molecular terminals as the polyurethane (A). Among the polyurethanes, it is essential to use a polyurethane that is obtained by causing a reaction of the polyisocyanate (a1) and the polyol (a2) within the range of the above equivalent ratio and that has a hydroxyl group at both molecular terminals.

In the case where a polyurethane having an isocyanate group is prepared by causing a reaction of the polyisocyanate (a1) and the polyol (a2) so that the equivalent ratio [isocyanate group [X]/hydroxyl group [Y]] of an isocyanate group [X] in the polyisocyanate (a1) to a hydroxyl group [Y] in the polyol (a2) exceeds 1 and subsequently the polyurethane having an isocyanate group is caused to react with a reaction terminator such as monoethanolamine to produce a polyurethane having a hydroxyl group at both molecular terminals, even if the produced polyurethane is used, good discharge stability sometimes cannot be achieved.

In the case where, for example, a polyol having an anionic group described below is used as the polyol (a2) and a polyurethane having, at both molecular terminals, a hydroxyl group derived from the polyol having an anionic group is used instead of the polyurethane (A), even if the polyol (a2) containing the polyether polyol (a2-1) is used, sufficient storage stability sometimes cannot be imparted.

The polyurethane (A) is preferably a polyurethane (A) having a hydrophilic group for the purpose of imparting good dispersion stability in the aqueous medium (B).

The hydrophilic group is, for example, an anionic group, a cationic group, or a nonionic group and is preferably an anionic group.

Examples of the anionic group that can be used include a carboxyl group, a carboxylate group, a sulfonic acid group, and a sulfonate group. Among them, an anionic group such as a carboxylate group or a sulfonate group in which some or all of carboxyl groups or sulfonic acid groups are neutralized with a basic compound or the like such as preferably potassium hydroxide is preferably used for the purpose of imparting good dispersion stability.

The polyurethane (A) is preferably a polyurethane having an acid value of 2 to 100 to improve the water dispersion stability of the polyurethane (A) in ink and more preferably a polyurethane having an acid value of 15 to 60 to obtain a binder for ink-jet printing ink that can be used for the production of an ink-jet printing ink having both water dispersion stability and discharge stability.

The polyurethane (A) is particularly preferably a polyurethane having an acid value of 40 to 60 to form, without impairing the water dispersion stability and discharge stability, a printed image having excellent alkali resistance at such a level that bleeding and the like are not caused even when an alkali component contained in a detergent and the like, which is stronger than an alcohol, is attached to the surface of the printed image.

The acid value is preferably derived from a carboxyl group, a carboxylate group, or the like serving as the above anionic group. The acid value in the present invention is a theoretical value calculated on the basis of the amount of an acid radical-containing compound, such as a carboxyl group-containing polyol, used in the production of the polyurethane (A).

The polyisocyanate (a1) and the polyol (a2) that can be used in the production of the polyurethane (A) are exemplified below.

Examples of the polyisocyanate (a1) that can be used include polyisocyanates having an aromatic structure such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, and naphthalene diisocyanate; aliphatic polyisocyanates (a1-1) such as hexamethylene diisocyanate, lysine diisocyanate, cyclohexane diisocyanate, isophorone diisocyanate, dicyclohexylmethane diisocyanate, xylylene diisocyanate, and tetramethylxylylene diisocyanate; and alicyclic structure-containing polyisocyanates (a1-2). Among them, aliphatic polyisocyanates (a1-1) and alicyclic structure-containing polyisocyanates (a1-2) are preferably used for the purpose of preventing the discoloration and further improving the scratch resistance and alcohol resistance.

The polyol (a2) contains the polyether polyol (a2-1) represented by general formula [I] as an essential component and may optionally contain a polyol having a hydrophilic group, such as a polyol having an anionic group, and other polyols in a combined manner.

A polyether polyol represented by general formula [I] below can be used as the polyether polyol (a2-1). Specifically, for example, polyoxytetramethylene glycol or propylene glycol can be used. Among them, polyoxytetramethylene glycol is preferably used for the purpose of imparting, for example, excellent water dispersion stability, excellent discharge stability, excellent scratch resistance, and excellent alcohol resistance.

[Chem. 3]

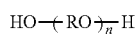

General formula [I]

(R in general formula [I] represents an alkylene group having 3 to 8 carbon atoms, and n is an average number of addition moles of a structural unit RO in general formula [I], n being in the range of 8 to 55.)

A polyether polyol obtained, for example, by addition polymerization of an alkylene oxide with 3 to 8 carbon atoms using, as an initiator, at least one compound having two or more active hydrogen atoms can be used as the polyether polyol (a2-1).

Examples of the initiator that can be used include ethylene glycol, diethylene glycol, triethylene glycol, propylene glycol, trimethylene glycol, 1,3-butanediol, 1,4-butanediol, 1,6-hexanediol, 1,4-cyclohexanedimethanol, glycerol, trimethylolethane, and trimethylolpropane.

Examples of the alkylene oxide that can be used include propylene oxide, butylene oxide, styrene oxide, epichlorohydrin, and tetrahydrofuran.

The content of the polyether polyol (a2-1) is preferably in the range of 5% to 95% by mass and more preferably in the range of 20% to 95% by mass relative to the total amount of the polyol (a2). The content is particularly preferably in the range of 70% to 95% by mass for the purpose of imparting excellent water dispersion stability, excellent discharge stability, and excellent scratch resistance.

The polyol (a2) is preferably, for example, a polyol having an anionic group for the purpose of introducing a hydrophilic group into the polyurethane (A) to impart good water dispersion stability.

Examples of the polyol having an anionic group that can be used include polyols having a carboxyl group and polyols having a sulfonic acid group.

Examples of the polyol having a carboxyl group that can be used include 2,2'-dimethylolpropionic acid, 2,2'-dimethylolbutanoic acid, 2,2'-dimethylolbutyric acid, and 2,2'-dimethylolvaleric acid. Among them, 2,2'-dimethylolpropionic acid is preferably used. A carboxyl group-containing polyester polyol obtained by causing a reaction of the polyol having a carboxyl group and a polycarboxylic acid can also be used.

Examples of the polyol having a sulfonic acid group that can be used include polyester polyols obtained by causing a reaction of a polyol such as the initiator that can be used in the production of the polyether polyol and dicarboxylic acid or a salt of the dicarboxylic acid, such as 5-sulfoisophthalic acid, sulfoterephthalic acid, 4-sulfophthalic acid, or 5-[4-sulfophenoxy]isophthalic acid.

Some or all of the anionic groups are preferably neutralized with a basic compound or the like for the purpose of achieving good water dispersibility.

Examples of the basic compound that can be used for the neutralization of the anionic group include organic amines having a boiling point of 200° C. or more, such as ammonia, triethylamine, morpholine, monoethanolamine, and diethylethanolamine; and metal hydroxides such as NaOH, KOH, and LiOH. Among them, potassium hydroxide is preferably used for the purpose of imparting excellent water dispersion stability.

The basic compound is used so as to preferably satisfy a ratio of basic compound/anionic group=0.5 to 3.0 (molar ratio) and more preferably satisfy a ratio of basic compound/anionic group=0.9 to 2.0 (molar ratio) for the purpose of improving the water dispersion stability of the polyurethane (A) to be obtained.

The ratio (neutralization ratio) of the anionic group of the polyurethane (A) neutralized with the basic compound, which is preferably potassium hydroxide, is preferably in the range of 90% to 99.9% by mass relative to the total amount of the anionic group.

It is more preferable to use the carboxyl group-containing polyol or the sulfonic acid group-containing polyol so that the acid value of the polyurethane (A) is adjusted to be in the above range.

The content of the hydrophilic group-containing polyol is preferably in the range of about 2% to 90% by mass, more preferably in the range of 5% to 70% by mass, and particularly preferably in the range of 10% to 50% by mass relative to the total amount of the polyol (a2) used in the production of the polyurethane (A).

In addition to the polyether polyol (a2-1) and the hydrophilic group-containing polyol such as an anionic group-containing polyol, the polyol (a2) may optionally contain other polyols in a combined manner.

Examples of the other polyols that can be used include polyether polyols that are other than the polyether polyol (a2-1) and do not have a hydrophilic group such as an anionic group, polycarbonate polyol, polyester polyol, and polyester-ether polyol.

The number-average molecular weight of the polyether polyol, polycarbonate polyol, polyester polyol, or polyester-ether polyol is preferably in the range of 800 to 5,000, more preferably in the range of 800 to 3,000, and particularly preferably in the range of 800 to 2,500.

A polyether polyol obtained, for example, by addition polymerization of an alkylene oxide using, as an initiator, at least one compound having two or more active hydrogen atoms can be used as the above polyether polyol.

Examples of the initiator that can be used include ethylene glycol, diethylene glycol, triethylene glycol, propylene glycol, trimethylene glycol, 1,3-butanediol, 1,4-butanediol, 1,6-hexanediol, 1,4-cyclohexanedimethanol, glycerol, trimethylolethane, and trimethylolpropane.

Examples of the alkylene oxide that can be used include ethylene oxide, propylene oxide, butylene oxide, styrene oxide, epichlorohydrin, and tetrahydrofuran.

Examples of the polycarbonate polyol that can be used include polycarbonate polyols obtained by causing a reaction of a carbonic acid ester and a polyol, and polycarbonate polyols obtained by causing a reaction of phosgene and bisphenol A or another compound.

Examples of the carbonic acid ester that can be used include methyl carbonate, dimethyl carbonate, ethyl carbonate, diethyl carbonate, cyclocarbonate, and diphenyl carbonate.

Examples of the polyol that can react with the carbonic acid ester include dihydroxy compounds having a relatively low molecular weight, such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 3-methyl-1,5-pentanediol, 2-ethyl-1,3-hexanediol, 2-methyl-1,3-propanediol, 2-methyl-1,8-octanediol, 2-butyl-2-ethylpropanediol, 2-methyl-1,8-octanediol, 1,4-cyclohexanediol, 1,4-cyclohexanedimethanol, hydroquinone, resorcin, bisphenol A, bisphenol F, and 4,4'-biphenol; polyether polyols such as polyethylene glycol, polypropylene glycol, and polytetramethylene glycol; and polyester polyols such as polyhexamethylene adipate, polyhexamethylene succinate, and polycaprolactone.

Examples of the polyester polyol that can be used include an aliphatic polyester polyol or aromatic polyester polyol obtained by causing an esterification reaction of a low-molecular-weight polyol and polycarboxylic acid, a polyester obtained by a ring-opening polymerization reaction of a cyclic ester compound such as ε-caprolactone, and a copolymer polyester of the foregoing. The polyester polyol is preferably a polyester polyol having an aliphatic or alicyclic structure.

Examples of the low-molecular-weight polyol that can be used include ethylene glycol and propylene glycol.

Examples of the polycarboxylic acid that can be used include succinic acid, adipic acid, sebacic acid, dodecanedicarboxylic acid, terephthalic acid, isophthalic acid, phthalic acid, and anhydrides or ester-forming derivatives thereof.

For example, a polyester-ether polyol obtained by causing a reaction of polycarboxylic acid and a polyether polyol obtained by adding the alkylene oxide to the initiator can be used as the above polyester-ether polyol. The same initiator and alkylene oxide as exemplified above that can be used in the production of the polyether polyol can be used. The same polycarboxylic acid as exemplified above that can be used in the production of the polyester polyol can be used.

At least one selected from the group consisting of polyether polyol, polycarbonate polyol, polyol polyester polyol, and polyester-ether polyol serving as the other polyols may be used in an amount of preferably 1% to 90% by mass relative to the total mass of the polyol (a2) used in the production of the polyurethane (A).

In addition to the other polyols described above, polyols having a relatively low molecular weight can be used as the other polyols. Specific examples of the polyols having a relatively low molecular weight include ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 3-methyl-1,5-pentanediol, ethyl-1,3-hexanediol, 2-methyl-1,3-propanediol, 2-methyl-1,8-octanediol, 2-butyl-2-ethylpropanediol, 2-methyl-1,8-octanediol, 1,4-cyclohexanediol, and 1,4-cyclohexanedimethanol.

The polyurethane (A) can be produced, for example, by causing a reaction of the polyisocyanate (a1) and the polyol (a2) without using a solvent or in the presence of an organic solvent by a publicly known method.

In the reaction of the polyisocyanate (a1) and the polyol (a2), as described above, it is essential to adjust the equivalent ratio [isocyanate group [X]/hydroxyl group [Y]] of an isocyanate group [X] in the polyisocyanate (a1) to a hydroxyl group [Y] in the polyol (a2) to be in a particular range of 0.930 to 0.995.

Herein, when a hydroxyl group derived from the polyether polyol (a2-1) contained in the polyol (a2) is used as the hydroxyl group present at both molecular terminals of the polyurethane (A), a desired polyurethane is preferably produced as follows. The polyisocyanate (a1) is caused to react with part of the polyol (a2) to prepare a urethane prepolymer having an isocyanate group at a molecular terminal. Subsequently, the isocyanate group in the urethane prepolymer is caused to react with a hydroxyl group in the polyether polyol (a2-1). Specifically, the polyisocyanate (a1) is caused to react with the anionic group-containing polyol or the like to prepare a urethane prepolymer having an isocyanate group at a molecular terminal. Subsequently, the isocyanate group in the urethane prepolymer is caused to react with a hydroxyl group in the polyether polyol (a2-1) to produce a desired polyurethane (A).

Also in the case where the polyurethane (A) is produced by the above method, in order to achieve the above object, it is essential to adjust, to be in the particular range, the equivalent ratio [isocyanate group [X]/hydroxyl group [Y]] of an isocyanate group [X] in the polyisocyanate (a1) to a hydroxyl group [Y] in the polyol (a2) used in the production of the polyurethane (A).

Examples of the organic solvent that can be used in the production of the polyurethane (A) include ketones such as acetone and methyl ethyl ketone; ethers such as tetrahydrofuran and dioxane; acetates such as ethyl acetate and butyl acetate; nitriles such as acetonitrile; and amides such as dimethylformamide and N-methylpyrrolidone. These organic solvents may be used alone or in combination of two or more.

In the production of the polyurethane (A), a chain extender such as ethylenediamine may be optionally used. However, a polyurethane obtained by using a chain extender tends to be slightly inferior in terms of the discharge stability of ink. Therefore, the content of the chain extender is preferably in the range of 0% to 5% by mass and more preferably in the range of 0% to 0.5% by mass relative to the total mass of the polyisocyanate (a1), the polyol (a2), and the chain extender.

In the polyurethane (A), the amount of urea bonds in the polyurethane (A) is preferably reduced by, for example, suppressing the use of the chain extender. Specifically, the amount of the urea bonds is preferably 0% to 2% by mass and more preferably 0% to 0.5% by mass relative to the mass of the polyurethane (A).

In the production of the polyurethane (A), a reaction terminator such as monoalkanolamine may be optionally used. However, as described above, the presence of a hydroxyl group derived from the polyol (a2) at the molecular terminal of the polyurethane (A) of the present invention can maintain good discharge stability of ink. Therefore, the reaction terminator is preferably not used as much as possible.

The polyurethane (A) produced by the above method can be made to have an aqueous state by, for example, the following method.

[Method 1]

The polyurethane (A) is produced by causing a reaction of the polyisocyanate (a1) and the polyol (a2). Some or all of hydrophilic groups such as anionic groups of the polyurethane (A) are neutralized. Then, water is added to the polyurethane (A) to disperse the polyurethane (A) in water.

[Method 2]

The polyurethane (A) is produced by causing a reaction of the polyisocyanate (a1) and the polyol (a2). Some or all of hydrophilic groups such as anionic groups of the polyurethane (A) are neutralized. Then, water is added to the polyurethane (A) and optionally the chain of the polyurethane (A) is extended using the chain extender to disperse the polyurethane (A) in water.

In the [method 1] and [method 2], an emulsifier may be optionally used for the purpose of improving the discharge stability of the polyurethane (A) in the aqueous medium (B). In the case of dissolution or dispersion in water, a machine such as a homogenizer may be optionally used.

The aqueous medium (B) used in the binder for ink-jet printing ink of the present invention is a medium in which the polyurethane (A) is dispersible.

The aqueous medium (B) may be water, an organic solvent miscible with water, or a mixture thereof. Examples of the organic solvent miscible with water include alcohols such as methanol, ethanol, n-propanol, and isopropanol; ketones such as acetone and methyl ethyl ketone; polyalkylene glycols such as ethylene glycol, diethylene glycol, and propylene glycol; alkyl ethers of a polyalkylene glycol; and lactams such as N-methyl-2-pyrrolidone. In the present invention, water may be used by itself, a mixture of water and an organic solvent miscible with water may be used, or an organic solvent miscible with water may be used by itself. Water by itself or a mixture of water and an organic solvent miscible with water is preferably used in view of the safety and the load on the environment. Water by itself is particularly preferably used.

The content of the aqueous medium (B) is preferably 50% to 90% by mass and more preferably 65% to 85% by mass relative to the total amount of the binder for ink-jet printing ink.

The binder for ink-jet printing ink of the present invention may optionally contain a curing agent or a curing catalyst as long as the storage stability and ink dischargeability are not degraded.

Examples of the curing agent that can be used include compounds having a silanol group and/or a hydrolyzable silyl group, polyepoxy compounds, polyoxazoline compounds, and polyisocyanates. Examples of the curing catalyst that can be used include lithium hydroxide, sodium hydroxide, and potassium hydroxide.

A polyurethane composition containing the polyurethane (A) and the aqueous medium (B) and produced by the above method can remarkably improve the scratch resistance and alcohol resistance of printed images. Therefore, such a polyurethane composition can be suitably used for a binder resin for ink-jet printing ink.

The content of the polyurethane (A) is preferably 10% to 50% by mass and more preferably 15% to 35% by mass relative to the total amount of the binder for ink-jet printing ink for the purpose of achieving both the storage stability of ink and excellent scratch resistance and alcohol resistance.

An ink-jet printing ink of the present invention will now be described.

The ink-jet printing ink of the present invention contains the binder for ink-jet printing ink, a pigment or a dye, and optionally various additives.

A publicly known inorganic pigment or organic pigment can be used as the pigment.

Examples of the inorganic pigment that can be used include titanium oxide, antimony red, iron red, cadmium red, cadmium yellow, cobalt blue, Prussian blue, ultramarine blue, carbon black, and graphite.

Examples of the organic pigment that can be used include quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, and azo pigments.

These pigments may be used in combination of two or more. These pigments may be surface-treated and have self-dispersibility in an aqueous medium.

Examples of the dye that can be used include azo dyes such as monoazo and disazo, metal complex salt dyes, naphthol dyes, anthraquinone dyes, indigo dyes, carbonium dyes, quinoimine dyes, cyanine dyes, quinoline dyes, nitro dyes, nitroso dyes, benzoquinone dyes, naphthoquinone dyes, naphthalimide dyes, perinone dyes, phthalocyanine dyes, and triallylmethanes.

Examples of the additives that can be used include a polymer dispersing agent, a viscosity modifier, a humectant, an antifoaming agent, a surfactant, a preservative, a pH adjusting agent, a chelating agent, a plasticizer, an ultraviolet absorber, an antioxidant, and an acrylic resin used in publicly known binders for ink-jet printing ink.

Examples of the polymer dispersing agent that can be used include random-type, block-type, or graft-type acrylic resins and styrene-acrylic resins. When the polymer dispersing agent is used, an acid or a base may be used together to neutralize the polymer dispersing agent.

The ink-jet printing ink can be produced, for example, by the following production method.

(1) A method for producing an ink by mixing the pigment or dye, the aqueous medium, the binder for ink-jet printing ink, and optionally the additives at one time using a dispersing device (2) A method for producing an ink by mixing the pigment or dye, the aqueous medium, and optionally the additives using a dispersing device to prepare an ink precursor composed of an aqueous dispersion body of the pigment or dye and then mixing the ink precursor composed of an aqueous dispersion body of the pigment or dye, the binder for ink-jet printing ink, and optionally an aqueous medium and additives using a dispersing device The ink precursor containing the pigment used in the ink production method (2) can be prepared, for example, by the following method.

(i) A method for preparing an ink precursor composed of an aqueous dispersion body containing a pigment by mixing a kneaded product and an aqueous medium using a dispersing device, the kneaded product being obtained by subjecting a pigment and additives such as a polymer dispersing agent to preliminary kneading using, for example, a twin roll or a mixer (ii) A method for preparing an ink precursor composed of an aqueous dispersion body containing a pigment by mixing a pigment and a polymer dispersing agent using a dispersing device, then depositing the polymer dispersing agent on a surface of the pigment through the control of the solubility of the polymer dispersing agent, and further mixing the pigment and the polymer dispersing agent using the dispersing device (iii) A method for preparing an ink precursor composed of an aqueous dispersion body containing a pigment by mixing a pigment and the additives using a dispersing device and then mixing the resulting mixture and a resin emulsion using the dispersing device Examples of the dispersing device that can be used in the production of the ink-jet printing ink include an ultrasonic homogenizer, a high-pressure homogenizer, a paint shaker, a ball mill, a roll mill, a sand mill, a sand grinder, Dyno-Mill, Dispermat, SC Mill, and Nanomizer. These dispersing devices may be used alone or in combination of two or more.

Coarse particles having a particle size of about 250 nm or more may be present in the ink-jet printing ink produced by the above method. Such coarse particles may cause clogging of printer nozzles and degrade the ink dischargeability. Therefore, after the preparation of the aqueous dispersion body of the pigment or after the preparation of the ink, such coarse particles are preferably removed by, for example, centrifugation or filtration.

The obtained ink-jet printing ink preferably has a volume-average particle size of 200 nm or less. In particular, when a higher gloss image having a quality like a film photo quality is formed, the volume-average particle size is preferably in the range of 80 to 120 nm.

The ink-jet printing ink preferably contains 0.2% to 10% by mass of the polyurethane (A), 50% to 95% by mass of the aqueous medium, and 0.5% to 15% by mass of the pigment or dye relative to the total amount of the ink-jet printing ink.

The ink-jet printing ink of the present invention produced by the above method can be particularly used for ink-jet printing conducted with an ink-jet printer. For example, the ink-jet printing ink can be used for ink-jet printing on a substrate such as a paper sheet, a plastic film, a metal film, or a metal sheet. The ink-jet method is not particularly limited, but the ink-jet printing ink can be applied to printers of known types such as continuous ejection types (e.g., a charge control type and a spray type) and on-demand types (such as a piezoelectric type, a thermal type, and an electrostatic attraction type).

Printed matter formed using the ink-jet printing ink of the present invention has excellent scratch resistance and thus the degradation or the like of printed images due to detachment of pigments is not easily caused. The printed matter also has excellent alkali resistance and thus bleeding or the like due to adhesion of an alkali detergent or the like to the surface of printed images can be prevented. The printed matter also has a high color density image and thus can be widely used as printed matter formed by, for example, ink-jet photo printing or ink-jet high-speed printing.

EXAMPLES

The present invention will now be further specifically described based on Examples and Comparative Examples.

Example 1

In a vessel equipped with a thermometer, a nitrogen gas-introducing tube, and a stirrer and purged with nitrogen, 103.07 parts by mass of 2,2-dimethylolpropionic acid and 233.91 parts by mass of isophorone diisocyanate were caused to react with each other in the presence of 336.98 parts by mass of methyl ethyl ketone serving as an organic solvent to produce a urethane prepolymer having an isocyanate group at both molecular terminals. Subsequently, 178.91 parts by mass of methyl ethyl ketone and 621.19 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 35,000 to 39,000, 6.91 parts by mass of methanol was added to terminate the reaction. Furthermore, 199.99 parts by mass of methyl ethyl ketone serving as a diluent was added thereto to obtain a polyurethane organic solvent solution.

By adding 83.66 parts by mass of 50 mass aqueous potassium hydroxide solution to the polyurethane organic solvent solution, some or all of carboxyl groups in the polyurethane were neutralized. Subsequently, 4241.35 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Example 2

In a vessel equipped with a thermometer, a nitrogen gas-introducing tube, and a stirrer and purged with nitrogen, 103.14 parts by mass of 2,2-dimethylolpropionic acid and 236.60 parts by mass of isophorone diisocyanate were caused to react with each other in the presence of 339.74 parts by mass of methyl ethyl ketone serving as an organic solvent to produce a urethane prepolymer having an isocyanate group at both molecular terminals. Subsequently, 176.13 parts by mass of methyl ethyl ketone and 618.40 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 66,000 to 70,000, 6.90 parts by mass of methanol was added to terminate the reaction. Furthermore, 199.98 parts by mass of methyl ethyl ketone serving as a diluent was added thereto to obtain a polyurethane organic solvent solution.

By adding 83.72 parts by mass of 50 mass % aqueous potassium hydroxide solution to the polyurethane organic solvent solution, some or all of carboxyl groups in the polyurethane were neutralized. Subsequently, 4241.34 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Example 3

In a vessel equipped with a thermometer, a nitrogen gas-introducing tube, and a stirrer and purged with nitrogen, 107.57 parts by mass of 2,2-dimethylolpropionic acid and 244.12 parts by mass of isophorone diisocyanate were caused to react with each other in the presence of 351.69 parts by mass of methyl ethyl ketone serving as an organic solvent to produce a urethane prepolymer having an isocyanate group at both molecular terminals. Subsequently, 186.73 parts by mass of methyl ethyl ketone and 648.31 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 34,000 to 38,000, 7.21 parts by mass of methanol was added to terminate the reaction. Furthermore, 208.72 parts by mass of methyl ethyl ketone serving as a diluent was added thereto to obtain a polyurethane organic solvent solution.

By adding 53.00 parts by mass of 25 mass % aqueous ammonia solution to the polyurethane organic solvent solution, some or all of carboxyl groups in the polyurethane were neutralized. Subsequently, 4198.62 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Example 4

In a vessel equipped with a thermometer, a nitrogen gas-introducing tube, and a stirrer and purged with nitrogen, 69.68 parts by mass of 2,2-dimethylolpropionic acid and 189.81 parts by mass of isophorone diisocyanate were caused to react with each other in the presence of 259.49 parts by mass of methyl ethyl ketone serving as an organic solvent to produce a urethane prepolymer having an isocyanate group at both molecular terminals. Subsequently, 263.70 parts by mass of methyl ethyl ketone and 712.23 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 44,000 to 48,000, 5.60 parts by mass of methanol was added to terminate the reaction. Furthermore, 204.21 parts by mass of methyl ethyl ketone serving as a diluent was added thereto to obtain a polyurethane organic solvent solution.

By adding 56.56 parts by mass of 50 mass % aqueous potassium hydroxide solution to the polyurethane organic solvent solution, some or all of carboxyl groups in the polyurethane were neutralized. Subsequently, 4244.67 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Example 5

In a vessel equipped with a thermometer, a nitrogen gas-introducing tube, and a stirrer and purged with nitrogen, 146.16 parts by mass of 2,2-dimethylolpropionic acid and 290.82 parts by mass of isophorone diisocyanate were caused to react with each other in the presence of 436.98 parts by mass of methyl ethyl ketone serving as an organic solvent to produce a urethane prepolymer having an isocyanate group at both molecular terminals. Subsequently, 64.49 parts by mass of methyl ethyl ketone and 503.70 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 28,000 to 32,000, 8.59 parts by mass of methanol was added to terminate the reaction. Furthermore, 194.53 parts by mass of methyl ethyl ketone serving as a diluent was added thereto to obtain a polyurethane organic solvent solution.

By adding 118.64 parts by mass of 50 mass % aqueous potassium hydroxide solution to the polyurethane organic solvent solution, some or all of carboxyl groups in the polyurethane were neutralized. Subsequently, 4237.05 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Comparative Example 1

In a vessel equipped with a thermometer, a nitrogen gas-introducing tube, and a stirrer and purged with nitrogen, 103.07 parts by mass of 2,2-dimethylolpropionic acid and 233.03 parts by mass of isophorone diisocyanate were caused to react with each other in the presence of 326.10 parts by mass of methyl ethyl ketone serving as an organic solvent to produce a urethane prepolymer having an isocyanate group at both molecular terminals. Subsequently, 189.79 parts by mass of methyl ethyl ketone and 632.07 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 25,000 to 29,000, 6.94 parts by mass of methanol was added to terminate the reaction. Furthermore, 199.95 parts by mass of methyl ethyl ketone serving as a diluent was added thereto to obtain a polyurethane organic solvent solution.

By adding 83.66 parts by mass of 50 mass % aqueous potassium hydroxide solution to the polyurethane organic solvent solution, some or all of carboxyl groups in the polyurethane were neutralized. Subsequently, 4241.35 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Comparative Example 2

In a vessel equipped with a thermometer, a nitrogen gas-introducing tube, and a stirrer and purged with nitrogen, 103.07 parts by mass of 2,2-dimethylolpropionic acid and 239.30 parts by mass of isophorone diisocyanate were caused to react with each other in the presence of 342.37 parts by mass of methyl ethyl ketone serving as an organic solvent to produce a urethane prepolymer having an isocyanate group at both molecular terminals. Subsequently, 173.52 parts by mass of methyl ethyl ketone and 615.80 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 53,000 to 57,000, 6.89 parts by mass of methanol was added to terminate the reaction. Furthermore, 200.00 parts by mass of methyl ethyl ketone serving as a diluent was added thereto to obtain a polyurethane organic solvent solution.

By adding 83.66 parts by mass of 50 mass % aqueous potassium hydroxide solution to the polyurethane organic solvent solution, some or all of carboxyl groups in the polyurethane were neutralized. Subsequently, 4241.35 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Comparative Example 3

In a vessel equipped with a thermometer, a nitrogen gas-introducing tube, and a stirrer and purged with nitrogen, 103.07 parts by mass of 2,2-dimethylolpropionic acid and 239.30 parts by mass of isophorone diisocyanate were caused to react with each other in the presence of 342.37 parts by mass of methyl ethyl ketone serving as an organic solvent to produce a urethane prepolymer having an isocyanate group at both molecular terminals. Subsequently, 173.52 parts by mass of methyl ethyl ketone and 615.80 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 19,000 to 23,000, 6.89 parts by mass of methanol was added to terminate the reaction. Furthermore, 200.00 parts by mass of methyl ethyl ketone serving as a diluent was added thereto to obtain a polyurethane organic solvent solution.

By adding 83.66 parts by mass of 50 mass % aqueous potassium hydroxide solution to the polyurethane organic solvent solution, some or all of carboxyl groups in the polyurethane were neutralized. Subsequently, 4241.35 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Comparative Example 4

In a vessel equipped with a thermometer, a nitrogen gas-introducing tube, and a stirrer and purged with nitrogen, 103.07 parts by mass of 2,2-dimethylolpropionic acid and 239.30 parts by mass of isophorone diisocyanate were caused to react with each other in the presence of 342.37 parts by mass of methyl ethyl ketone serving as an organic solvent to produce a urethane prepolymer having an isocyanate group at both molecular terminals. Subsequently, 173.52 parts by mass of methyl ethyl ketone and 615.80 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 78,000 to 82,000, 6.89 parts by mass of methanol was added to terminate the reaction. Furthermore, 200.00 parts by mass of methyl ethyl ketone serving as a diluent was added thereto to obtain a polyurethane organic solvent solution.

By adding 83.66 parts by mass of 50 mass % aqueous potassium hydroxide solution to the polyurethane organic solvent solution, some or all of carboxyl groups in the polyurethane were neutralized. Subsequently, 4241.35 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Comparative Example 5

In a vessel equipped with a thermometer, a nitrogen gas-introducing tube, and a stirrer and purged with nitrogen, 103.07 parts by mass of 2,2-dimethylolpropionic acid and 246.82 parts by mass of isophorone diisocyanate were caused to react with each other in the presence of 349.88 parts by mass of methyl ethyl ketone serving as an organic solvent to produce a urethane prepolymer having an isocyanate group at both molecular terminals. Subsequently, 166.01 parts by mass of methyl ethyl ketone and 608.28 parts by mass of "PTMG 2000" (polyoxytetramethylene glycol manufactured by Mitsubishi Chemical Corporation, number-average molecular weight 2,000, average number of addition moles (n in general formula [I]) 27.5) were added thereto and the reaction was further continued.

When the weight-average molecular weight of the reaction product reached 30,000 to 34,000, 4.59 parts by mass of monoethanolamine was added to terminate the reaction. Furthermore, 210.35 parts by mass of methyl ethyl ketone serving as a diluent was added thereto to obtain a polyurethane organic solvent solution.

By adding 83.66 parts by mass of 50 mass % aqueous potassium hydroxide solution to the polyurethane organic solvent solution, some or all of carboxyl groups in the polyurethane were neutralized. Subsequently, 4233.30 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

Comparative Example 6

In a vessel equipped with a thermometer, a nitrogen gas-introducing tube, and a stirrer and purged with nitrogen, 621.19 parts by mass of "PTMG 2000" (polyoxytetramethylene glycol manufactured by Mitsubishi Chemical Corporation, number-average molecular weight 2,000, average number of addition moles (n in general formula [I]) 27.5) and 233.91 parts by mass of isophorone diisocyanate were caused to react with each other in the presence of 213.78 parts by mass of methyl ethyl ketone serving as an organic solvent to produce a urethane prepolymer having an isocyanate group at both molecular terminals. Subsequently, 302.11 parts by mass of methyl ethyl ketone and 103.07 parts by mass of 2,2-dimethylolpropionic acid were added thereto and the reaction was further continued.

When the weight-average molecular weight of the reaction product reached 30,000 to 34,000, 6.91 parts by mass of methanol was added to terminate the reaction. Furthermore, 199.99 parts by mass of methyl ethyl ketone serving as a diluent was added thereto to obtain an organic solvent solution of a polyurethane having, at both molecular terminals, a hydroxyl group derived from 2,2-dimethylolpropionic acid.

By adding 83.66 parts by mass of 50 mass aqueous potassium hydroxide solution to the polyurethane organic solvent solution, some or all of carboxyl groups in the polyurethane were neutralized. Subsequently, 4241.35 parts by mass of water was added, and thorough stirring was performed to obtain a polyurethane water dispersion body.

The polyurethane water dispersion body was then subjected to aging and removal of the solvent to obtain a binder for ink-jet printing ink having a nonvolatile content of 25 mass %.

[Measurement of Weight-Average Molecular Weight]

The weight-average molecular weight of the polyurethane (C) was measured by gel permeation chromatography (GPC). Specifically, the polyurethane (C) was applied onto a glass plate using a 3 mil applicator and dried at room temperature for one hour to form a semi-dry film. The resulting film was detached from the glass plate and 0.4 g of the film was dissolved in 100 g of tetrahydrofuran to prepare a measurement sample.

A high-performance liquid chromatograph HLC-8220 manufactured by Tosoh Corporation was used as the measurement equipment. Columns of TSK-GEL (HXL-H, G5000HXL, G4000HXL, G3000HXL, and G2000HXL) manufactured by Tosoh Corporation were used in a combined manner.

A calibration curve was made by using, as standard samples, standard polystyrenes (molecular weight: 4,480,000, 4,250,000, 2,880,000, 2,750,000, 1,850,000, 860,000, 450,000, 411,000, 355,000, 190,000, 160,000, 96,400, 50,000, 37,900, 19,800, 19,600, 5,570, 4,000, 2,980, 2,030, and 500) manufactured by Showa Denko K.K. and Tosoh Corporation.

Tetrahydrofuran was used as an eluent and a sample dissolving liquid. The weight-average molecular weight was measured using an RI detector at a flow rate of 1 mL/min at a sample injection amount of 500 μL in a sample concentration of 0.4 mass %.

Preparation Example 1

Aqueous Dispersion Body of Quinacridone Pigment

Into a 50 L planetary mixer PLM-V-50V (INOUE MFG., INC.), 1500 g of vinyl polymer (styrene/acrylic acid/methacrylic acid=77/10/13 (mass ratio), weight-average molecular weight 11,000, acid value 156 mgKOH/g), 4630 g of quinacridone pigment (Cromophtal Jet Magenta DMQ manufactured by Ciba Specialty Chemicals Inc.), 380 g of phthalimide methylated 3,10-dichloroquinacridone (the average number of phthalimidemethyl groups per molecule 1.4), 2600 g of diethylene glycol, and 688 g of 34 mass % aqueous potassium hydroxide solution were charged. The mixture was continuously kneaded for four hours.

To the kneaded product, 8000 g in total of ion-exchanged water heated to 60° C. was added over two hours to obtain a colored resin composition having a nonvolatile content of 37.9 mass %.

To 12 kg of the colored resin composition obtained by the above method, 744 g of diethylene glycol and 7380 g of ion-exchanged water were added little by little and stirred using a dispersing device to obtain a precursor of an aqueous pigment dispersion liquid (aqueous pigment dispersion liquid before dispersion treatment).

Subsequently, 18 kg of the precursor of an aqueous pigment dispersion liquid was processed using a bead mill (Nano Mill NM-G2L manufactured by ASADA IRON WORKS. CO., LTD., bead ϕ: zirconia beads with a size of 0.3 mm, the amount of beads charged: 85%, the temperature of cooling water: 10° C., the number of revolutions: 2660 revolutions/minute). The resulting solution processed through the bead mill was subjected to a centrifugal treatment at 13,000 G for 10 minutes and then filtered using a filter having an effective pore diameter of 0.5 μm to obtain an aqueous pigment dispersion liquid of quinacridone pigment. The concentration of the quinacridone pigment in the aqueous pigment dispersion liquid was 14.9 mass %.

[Preparation of Ink-Jet Printing Ink]

Each of the binders for ink-jet printing ink obtained in Examples 1 to 6 and Comparative Examples 1 to 6, the aqueous pigment dispersion liquid of quinacridone pigment obtained in Preparation Example 1, 2-pyrrolidinone, triethylene glycol monobutyl ether, glycerol, a surfactant (Surfynol 440 manufactured by Air Products and Chemicals, Inc.), and ion-exchanged water were mixed and stirred in accordance with the following mixing ratio so that the concentration of the quinacridone pigment was 4 mass % and the concentration of the polyurethane was 1 mass %. Thus, an ink-jet printing ink was prepared.

(Mixing ratio of ink-jet printing ink)
- Aqueous pigment dispersion liquid of quinacridone pigment obtained in Preparation Example 1 (pigment concentration 14.9 mass %): 26.8 g
- 2-pyrrolidinone: 8.0 g
- Triethylene glycol monobutyl ether: 8.0 g
- Glycerol: 3.0 g
- Surfactant (Surfynol 440 manufactured by Air Products and Chemicals, Inc.): 0.5 g
- Ion-exchanged water: 48.7 g
- Binders for ink-jet printing ink obtained in Examples 1 to 6 and Comparative Examples 1 to 6 (nonvolatile content 25 mass %): 4.0 g

[Evaluation of Storage Stability of Ink-Jet Printing Ink]

The evaluation was conducted based on the viscosity of the obtained ink-jet printing ink and the particle size of particles dispersed in the ink. The viscosity was measured with VISCOMETER TV-22 manufactured by Toki Sangyo Co., Ltd. and the particle size was measured with Microtrack UPA EX150 manufactured by NIKKISO CO., LTD.

The ink was then put into a glass container such as a screw tube with hermetical sealing. After a heating test was conducted in a thermostat at 70° C. for four weeks, the viscosity of the ink and the particle size of particles dispersed in the ink were measured by the same method as above.

The changes in the viscosity and particle size of the ink after the heating test from the viscosity and particle size of the ink before the heating test were calculated from the following formulae to evaluate the storage stability of the pigment ink.

$$[\{(\text{Particle size of particles dispersed in ink after heating test}) - (\text{Particle size of particles dispersed in ink before heating test})\}/(\text{Particle size of particles dispersed in ink before heating test})] \times 100 \quad \text{(Formula I)}$$

[Criteria]

Good: The ratio of the change in the particle size was less than 5%.

Fair: The ratio of the change in the particle size was 5% or more and less than 10%.

Poor: The ratio of the change in the particle size was 10% or more.

$$[\{(\text{Viscosity of ink after heating test}) - (\text{Viscosity of ink before heating test})\}/(\text{Viscosity of ink before heating test})] \times 100 \quad \text{(Formula II)}$$

[Criteria]

Good: The ratio of the change in the viscosity was less than 2%.

Fair: The ratio of the change in the viscosity was 2% or more and less than 5%.

Poor: The ratio of the change in the viscosity was 5% or more.

[Evaluation of Discharge Stability of Ink]

A diagnostic page was printed with Photosmart D5360 (manufactured by Hewlett-Packard Company) in which a black ink cartridge was filled with the above ink-jet printing ink and the nozzle state was checked. Solid printing with a print density of 100% was continuously performed on 600 pages in a region of 18 cm×25 cm per page. Then, a diagnostic page was printed again and the nozzle state was checked. The change in the nozzle states before and after the continuous solid printing was evaluated as the ink dischargeability. The evaluation criteria are shown below.

[Criteria]

Excellent: No change in the nozzle states was observed and no irregular ink discharge occurred.

Good: Slight adhesion of the ink to the nozzle was observed, but no irregularity of the discharge direction of the ink occurred.

Fair: After solid printing was continuously performed on 600 pages, irregularity of the discharge direction of the ink or no discharge of the ink occurred.

Poor: Irregularity of the discharge direction of the ink or no discharge of the ink occurred during the printing, and thus the 600 pages were not completely printed in a continuous manner.

[Evaluation of Printing Properties of Ink-Jet Printing Pigment Ink]

Solid printing with a print density of 100% was performed on a printing surface of photographic paper (glossy) [HP Advanced Photo Paper manufactured by Hewlett-Packard Company], which is special paper for ink-jet printing, using a commercially available thermal jet-type ink-jet printer (Photosmart D5360 manufactured by Hewlett-Packard Company) in which a black ink cartridge was filled with the above pigment ink.

[Scratch Resistance]

Solid printing with a print density of 100% was performed on a printing surface of photographic paper (glossy) [HP Advanced Photo Paper manufactured by Hewlett-Packard Company] using a commercially available thermal jet-type ink-jet printer (Photosmart D5360 manufactured by Hewlett-Packard Company) in which a black ink cartridge was filled with the above pigment ink. Thus, printed matter for evaluation was obtained.

After the printed matter for evaluation was dried at room temperature for 10 minutes, the printed surface was rubbed with a nail while applying a load of about 5 kg. The degree of rubbing of color or the like on the printed surface was evaluated through visual inspection based on the following evaluation criteria. Note that "unable to print" is given in Tables when the printed matter for evaluation was not able to be obtained due to insufficient discharge stability of ink.

[Criteria]

A: No scratches were formed at all on the printed surface and the detachment and the like of a color material were not observed.

B: Scratches were slightly formed on the printed surface, but this caused no practical problems and the detachment and the like of a color material were not observed.

C: Scratches were slightly formed on the printed surface and the detachment and the like of a color material were also observed.

D: Scratches were considerably formed in about 50% or more of an area of the printed surface and the detachment and the like of a color material were also observed.

[Chemical Resistance]

(Alcohol Resistance)

After the printed matter for evaluation was dried at room temperature for 10 minutes, three drops of 5 mass % aqueous ethanol solution were dropped onto the printed surface with a dropper. After 10 seconds, the printed surface was rubbed with a finger to evaluate the surface state of the printed surface through visual inspection. The evaluation criteria are shown below. Note that "unable to print" is given in Tables when the printed matter for evaluation was not able to be obtained due to insufficient discharge stability of ink.

[Criteria]

A: Detachment of a color material and the like was not observed on the printed surface and discoloration of the printed surface was also not observed.

B: Detachment of a color material and the like was not observed on the printed surface, but slight discoloration of the printed surface was observed.

C: A small degree of detachment of a color material and the like was observed on the printed surface and the printed surface was discolored.

D: A large degree of detachment of a color material and the like was observed in about 50% or more of an area of the printed surface and the printed surface was discolored.

(Alkali Resistance)

After the printed matter for evaluation was dried at room temperature for 10 minutes, three drops of 0.7 mass % aqueous KOH solution were dropped onto the printed surface with a dropper. After 10 seconds, the printed surface was rubbed with a finger to evaluate the surface state of the printed surface through visual inspection. The evaluation criteria are shown below. Note that "unable to print" is given in Tables when the printed matter for evaluation was not able to be obtained due to insufficient discharge stability of ink.

[Criteria]

A: Detachment of a color material and the like was not observed on the printed surface and discoloration of the printed surface was also not observed.

B: Detachment of a color material and the like was not observed on the printed surface, but slight discoloration of the printed surface was observed.

C: A small degree of detachment of a color material and the like was observed on the printed surface and the printed surface was discolored.

D: A large degree of detachment of a color material and the like was observed in about 50% or more of an area of the printed surface and the printed surface was discolored.

TABLE 1

|  | Example 1 | Example 2 | Example 3 | Example 4 | Example 5 |
|---|---|---|---|---|---|
| Polyisocyanate (a1) | IPDI | IPDI | IPDI | IPDI | IPDI |
| Polyol (a2) | PTMG2K DMPA | PTMG2K DMPA | PTMG2K DMPA | PTMG2K DMPA | PTMG2K DMPA |
| Neutralizing agent | KOH | KOH | NH3 | KOH | KOH |
| [Isocyanate group [X]/Hydroxyl group [Y]] (equivalent) | 0.975 | 0.987 | 0.975 | 0.975 | 0.975 |
| Acid value | 45 | 45 | 45 | 30 | 65 |
| Weight-average molecular weight | 37,000 | 68,000 | 36,000 | 46,000 | 30,000 |
| Storage stability | | | | | |
| Change in particle size | Good | Good | Good | Good | Good |
| Change in viscosity | Good | Good | Good | Good | Good |
| Discharge stability of ink | Excellent | Good | Good | Good | Excellent |
| Printing properties | | | | | |
| Scratch resistance | A | A | A | A | A |
| Chemical resistance | | | | | |
| Alcohol resistance | A | A | A | A | B |
| Alkali resistance | B | A | C | B | C |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Polyisocyanate (a1) | IPDI | IPDI | IPDI | IPDI | IPDI | IPDI |
| Polyol (a2) | PTMG2K DMPA | PTMG2K DMPA | PTMG2K DMPA | PTMG2K DMPA | PTMG2K DMPA | PTMG2K DMPA |
| Neutralizing agent | KOH | KOH | KOH | KOH | KOH | KOH |
| [Isocyanate group [X]/Hydroxyl group [Y]] (equivalent) | 0.925 | 1.000 | 1.000 | 1.000 | 1.025 | 0.975 |
| Acid value | 45 | 45 | 45 | 45 | 45 | 45 |
| Weight-average molecular weight | 27,000 | 55,000 | 21,000 | 80,000 | 32,000 | 32,000 |
| Storage stability | | | | | | |
| Change in particle size | Good | Good | Good | Fair | Fair | Good |
| Change in viscosity | Good | Good | Good | Good | Good | Good |
| Discharge stability of ink | Fair | Fair | Fair | Poor | Fair | Fair |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| Printing properties | | | | | | |
| Scratch resistance | B | A | C | A | B | A |
| Chemical resistance | | | | | | |
| Alcohol resistance | A | A | B | A | C | C |
| Alkali resistance | C | C | C | B | C | A |

The abbreviations in Tables 1 and 2 are described below.

"IPDI": isophorone diisocyanate

"PTMG2K": "PTMG 2000" polyoxytetramethylene glycol manufactured by Mitsubishi Chemical Corporation, number-average molecular weight 2,000, average number of addition moles (n in general formula [I]) 27.5

"DMPA": 2,2-dimethylolpropionic acid

"KOH": potassium hydroxide

"NH3": ammonia

[Isocyanate group [X]/Hydroxyl group [Y]] (equivalent) is a value calculated on the basis of the number-average molecular weight 2000 of polyoxytetramethylene glycol and the theoretical molecular weights of isophorone diisocyanate and 2,2-dimethylolpropionic acid.

The ink-jet printing ink described in Example 1 is excellent in terms of storage stability and particularly discharge stability of ink, and printed matter having excellent scratch resistance and excellent chemical resistance such as alcohol resistance can be formed. The ink-jet printing ink described in Example 2 in which the molecular weight of polyurethane is relatively high is excellent in terms of storage stability and discharge stability of ink, and printed matter having excellent scratch resistance and particularly excellent alkali resistance can be formed. The ink-jet printing ink described in Example 3 that contains a polyurethane having a hydrophilic group formed by neutralizing a carboxyl group with ammonia is excellent in terms of storage stability and discharge stability of ink, and printed matter having excellent scratch resistance and excellent alcohol resistance can be formed. The ink-jet printing ink described in Example 4 that contains a polyurethane having a relatively low acid value compared with the ink-jet printing ink described in Example 1 is excellent in terms of storage stability and discharge stability of ink, and printed matter having excellent scratch resistance and excellent chemical resistance such as alcohol resistance can be formed. The ink-jet printing ink described in Example 5 that contains a polyurethane having a relatively high acid value compared with the ink-jet printing ink described in Example 1 is excellent in terms of storage stability and particularly discharge stability of ink, and printed matter having excellent scratch resistance and good alcohol resistance can be formed.

In the ink-jet printing ink described in Comparative Example 1 that contains a polyurethane having a value of [isocyanate group [X]/hydroxyl group [Y]] of 0.925, which is outside the above range, the discharge stability of ink degraded and the irregularity of the discharge direction of the ink or no discharge of the ink occurred after solid printing was continuously performed on 600 pages. In the ink-jet printing ink described in Comparative Example 2 that contains a polyurethane having a value of [isocyanate group [X]/hydroxyl group [Y]] of 1.000, which is outside the above range, the discharge stability of ink degraded and the irregularity of the discharge direction of the ink or no discharge of the ink occurred after solid printing was continuously performed on 600 pages. In the ink-jet printing ink described in Comparative Example 3 that contains a polyurethane having a value of [isocyanate group [X]/hydroxyl group [Y]] of 1.000, which is outside the above range, and having a low weight-average molecular weight of 21,000, the discharge stability of ink degraded and also the scratch resistance and chemical resistance sometimes degraded. In the ink-jet printing ink described in Comparative Example 4 that contains a polyurethane having a value of [isocyanate group [X]/hydroxyl group [Y]] of 1.000, which is outside the above range, and having a weight-average molecular weight of 80,000, the storage stability degraded and the discharge stability of ink remarkably degraded, the irregularity of the discharge direction of the ink or no discharge of the ink occurred during the printing, and the continuous printing of 600 pages was not completed. In the ink-jet printing ink described in Comparative Example 5 that contains a polyurethane having a value of [isocyanate group [X]/hydroxyl group [Y]] of 1.025, which is outside the above range, the storage stability and the discharge stability of ink degraded and the irregularity of the discharge direction of the ink or no discharge of the ink occurred after solid printing was continuously performed on 600 pages. In the ink-jet printing ink described in Comparative Example 6 that contains a polyurethane in which the hydroxyl group at the molecular terminal of the polyurethane is a hydroxyl group derived from 2,2-dimethylolpropionic acid, the storage stability and the discharge stability of ink degraded and the irregularity of the discharge direction of the ink or no discharge of the ink occurred after solid printing was continuously performed on 600 pages.

The invention claimed is:

1. A binder for ink-jet printing ink, comprising:
   a polyurethane (A) that has a hydroxyl group at a molecular terminal, has a weight-average molecular weight of 30,000 to 70,000, and is obtained by preparing a urethane prepolymer having an isocyanate group at a molecular terminal through a reaction of a polyisocyanate (a1) and part of a polyol (a2) and then causing a reaction of the urethane prepolymer and the polyether polyol (a2-1); and
   an aqueous medium (B),
   wherein:
   the hydroxyl group present at the molecular terminal of the polyurethane (A) is a hydroxyl group derived from the polyether polyol (a2-1);
   the equivalent ratio of an isocyanate group [X] in the polyisocyanate (a1) to a hydroxyl group [Y] in the polyol (a2), isocyanate group [X]/hydroxyl group [Y], is in the range of 0.930 to 0.995; and
   the polyol (a2) contains the polyether polyol (a2-1), which is represented by general formula [I]:

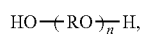

where R represents an alkylene group having 3 to 8 carbon atoms, and n is an average number of addition moles of a structural unit RO, n being in the range of 8 to 55.

2. The binder for ink jet printing ink according to claim 1, wherein the polyurethane (A) has a hydrophilic group, and the hydrophilic group is an anionic group formed by neutralization with potassium hydroxide.

3. A method for producing the binder of claim 1 for ink jet printing ink, the binder containing a polyurethane (A) having, at a molecular terminal, a hydroxyl group derived from a polyether polyol (a2-1) represented by general formula and [I] an aqueous medium (B), the method comprising producing the polyurethane (A) by preparing a urethane prepolymer having an isocyanate group at a molecular terminal through a reaction of a polyisocyanate (a1) and part of a polyol (a2) and then causing a reaction of the urethane prepolymer and the polyether polyol (a2-1) represented by general formula [I], wherein the equivalent ratio of an isocyanate group [X] in the polyisocyanate (a1) to a hydroxyl group [Y] in the polyol (a2), isocyanate group [X]/hydroxyl group [Y], is in the range of 0.930 to 0.995, and the polyether polyol (a2-1) of general formula is:

where R represents an alkylene group having 3 to 8 carbon atoms, and n is an average number of addition moles of a structural unit RO, n being in the range of 8 to 55.

4. An ink-jet printing ink comprising the binder for ink-jet printing ink according to claims 1 and a pigment or dye.

5. Printed matter formed by performing printing with the ink-jet printing ink according to claim 4.

6. An ink-jet printing ink comprising the binder for ink-jet printing ink according to claim 2 and a pigment or dye.

7. Printed matter formed by performing printing with the ink jet printing ink according to claim 6.

* * * * *